(12) United States Patent
Kuchibhotla et al.

(10) Patent No.: US 11,934,665 B2
(45) Date of Patent: Mar. 19, 2024

(54) SYSTEMS AND METHODS FOR EPHEMERAL STORAGE SNAPSHOTTING

(71) Applicant: TESSELL, INC., San Ramon, CA (US)

(72) Inventors: Balasubrahmanyam Kuchibhotla, San Ramon, CA (US); Uday Kiran Jonnala, San Ramon, CA (US); Kamaldeep Singh Khanuja, Dublin, CA (US); Maneesh Rawat, Karnataka (IN); Manish Pratap Singh, Santa Clara, CA (US); Bakul Banthia, San Ramon, CA (US)

(73) Assignee: TESSELL, INC., San Ramon, CA (US)

( * ) Notice: Subject to any disclaimer, the term of this patent is extended or adjusted under 35 U.S.C. 154(b) by 113 days.

(21) Appl. No.: 17/751,930

(22) Filed: May 24, 2022

(65) Prior Publication Data

US 2023/0409206 A1 Dec. 21, 2023

(51) Int. Cl.
*G06F 12/00* (2006.01)
*G06F 3/06* (2006.01)

(52) U.S. Cl.
CPC .......... *G06F 3/0619* (2013.01); *G06F 3/0632* (2013.01); *G06F 3/0659* (2013.01); *G06F 3/067* (2013.01)

(58) Field of Classification Search
None
See application file for complete search history.

(56) References Cited

U.S. PATENT DOCUMENTS

| 11,023,318 B1 * | 6/2021 | Volkov | G06F 16/1805 |
| 2016/0173599 A1 * | 6/2016 | Chablani | G06F 11/3433 |
| | | | 709/217 |
| 2019/0347166 A1 * | 11/2019 | Chen | G06F 11/3006 |

* cited by examiner

*Primary Examiner* — Daniel D Tsui
(74) *Attorney, Agent, or Firm* — MARSHALL, GERSTEIN & BORUN LLP

(57) ABSTRACT

Systems, methods, and computer readable media for snapshotting ephemeral and/or volatile storage systems are provided. These techniques may include synchronizing that state of the ephemeral storage system to a cloud-based storage system and capturing a cloud snapshot of the cloud-based storage system. To reduce the time to capture a cloud snapshot, techniques disclosed herein include obtaining sets of pending data changes to the ephemeral storage system that have not been synchronized to the cloud-based storage system. When the pending data changes satisfy a threshold metric, the pending data changes may then be synchronized to the ephemeral storage system on a rolling basis.

20 Claims, 10 Drawing Sheets

SYSTEMS AND METHODS FOR EPHEMERAL STORAGE SNAPSHOTTING

FIELD OF THE DISCLOSURE

The present disclosure generally relates to providing the ability to snapshot a local storage system and, more specifically, to providing the snapshot ability based upon opportunistic synchronization techniques.

BACKGROUND

Generally, there are two main categories of storage systems, local storage systems that are present on-premises and cloud-based storage systems via which a cloud manager interfaces with any number of storage resources at a remote location. Local storage systems typically implement volatile or ephemeral storage of data. As a result, when the local storage system experiences an outage or is otherwise turned off to save on power costs, the data stored at the local storage system is lost. On the other hand, if the user's data is instead stored in a cloud-based storage system, a local failure does not result in data loss. Another drawback of traditional local storage systems is that given the on-premise nature of local storage systems, the volumes cannot be readily ported to different computes and/or databases. On the other hand, cloud-based storage systems typically include the ability to capture a snapshot of a volume such that it can be readily mounted to different computes. In other words, the snapshot capability of cloud-based storage system provides data portability to users thereof.

However, cloud-based storage systems typically provide much slower access to one's data (often measured in terms of input/output operations per second or IOPS). Because a local storage system can be accessed without communicating over an external communication network, local storage systems are able to provide far greater IOPS than a cloud-based storage system for a given budget. For example, for some levels of IOPS, a local storage system is over ten times cheaper than a cloud-based storage. Accordingly, there is a need for a hybrid storage system that provides users the low-cost and high-speed access to data of local storage systems while also providing the data recovery and portability capabilities generally provided by cloud-based storage systems.

BRIEF SUMMARY

In one aspect, a system is provided. The system includes (i) a first network interface communicatively coupled to an ephemeral storage system; (ii) a second network interface communicatively coupled to a cloud-based storage system; (iii) one or more memories storing computer-readable instructions; and (iv) one or more processors operatively connected to the first and second network interfaces and the one or more memories. The one or more processors are configured to execute the computer-readable instructions to (1) obtain a set of pending data changes of the ephemeral storage system, wherein the data changes indicate changes to a state of the ephemeral storage system from a previous state; (2) in response to the set of pending data changes satisfying a threshold metric, update a state of the cloud-based storage system to reflect the changes to the state of the ephemeral storage system indicated by the set of pending data changes; (3) detect an event indicating that a cloud-based snapshot is to be generated; and (4) in response to detecting the event (a) compile a first set of pending data changes that indicates changes to the state of the ephemeral storage system from a previous state of the ephemeral storage system to a state at a time indicated by the event; (b) update a state of the cloud-based storage system to reflect the change to the state of the ephemeral storage system indicated by the first set of pending data changes; (c) generate a snapshot of the cloud-based storage system; and (d) store the snapshot of the cloud-based storage system in a cloud snapshot storage.

In another aspect, a method is provided. The method includes (1) obtaining a set of pending data changes of an ephemeral storage system, wherein the data changes indicate changes to a state of the ephemeral storage system from a previous state; (2) in response to the set of pending data changes satisfying a threshold metric, updating a state of the cloud-based storage system to reflect the changes to the state of the ephemeral storage system indicated by the set of pending data changes; (3) detecting an event indicating that a cloud-based snapshot is to be generated; and (4) in response to detecting the event (a) compiling a first set of pending data changes that indicates changes to the state of the ephemeral storage system from a previous state of the ephemeral storage system to a state at a time indicated by the event; (b) updating a state of the cloud-based storage system to reflect the change to the state of the ephemeral storage system indicated by the first set of pending data changes; (c) generating a snapshot of the cloud-based storage system; and (d) storing the snapshot of the cloud-based storage system in a cloud snapshot storage.

DETAILED DESCRIPTION

Figure 1A:
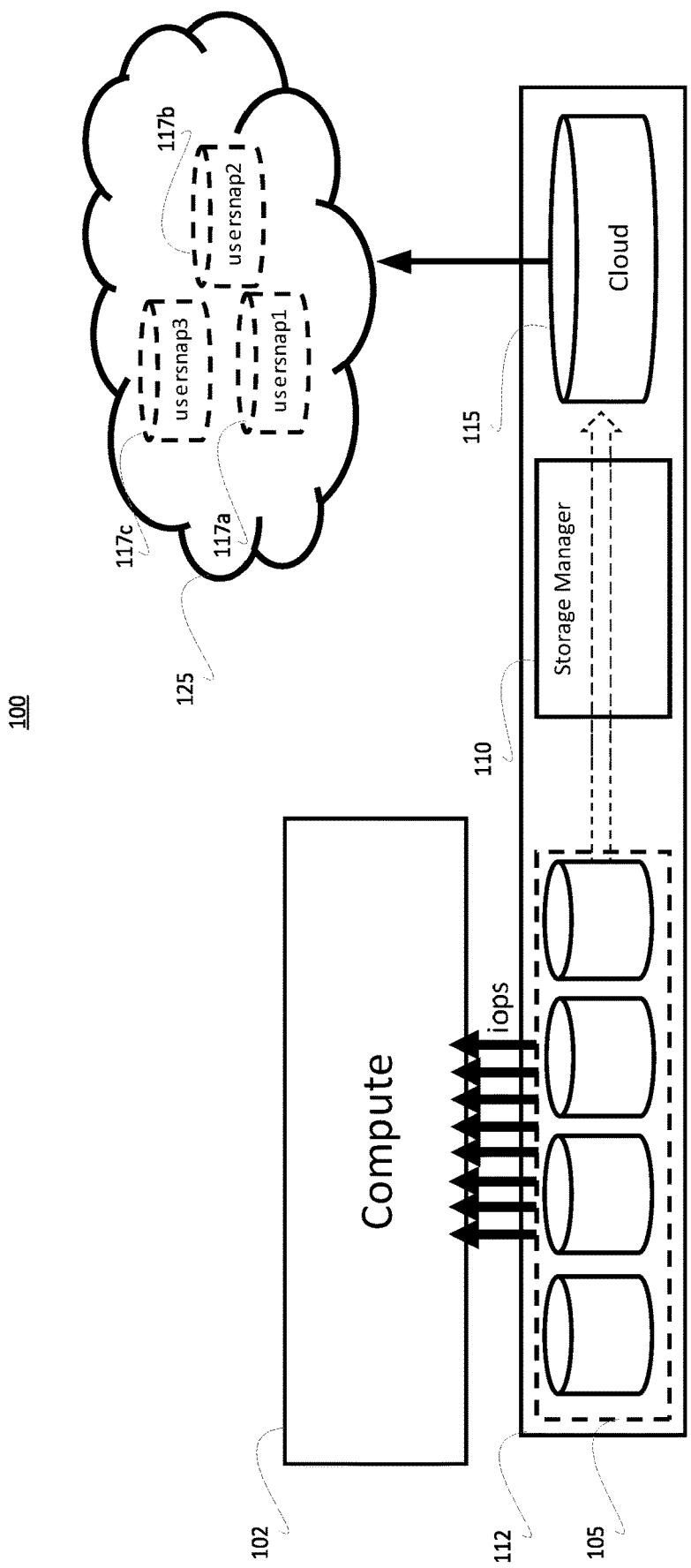
FIG. 1A depicts an example environment via which the disclosed techniques are implemented, according to one embodiment.

The embodiments described herein relate to, inter alia, providing a hybrid storage system that pairs the low-cost and high IOPS of a local storage system with the data portability and recoverability of a cloud-based storage system. FIG. 1 depicts an example environment 100 via which the disclosed techniques are implemented. The example environment 100 includes a hybrid storage system 112 that includes a local storage system 105 and a cloud-based storage system 125 that are managed via a storage manager 110. As illustrated, the local storage system 105 of the hybrid storage system 112 is attached to a compute 102. The compute 102 may be any type of compute resource and include physical compute resources (e.g., a server, a host, a processing unit, a disk repository) and/or virtualized compute resources (e.g., a pod, a node, a cluster of pods/nodes, etc.). For ease of illustration, FIG. 1A only depicts the hybrid storage system 112 having only a single local storage system 105 being attached to a single compute 102. However, depending upon the customer's desired configuration, the hybrid storage system 112 may include any number of local storage systems 105 attached to respective computes 102 that are managed by the storage manager 110.

Although the term "local" is generally used herein as a contrast to "cloud-based," in embodiments where the compute 102 includes virtualized components, the "local" storage system 105 may also be implemented via a cloud computing platform. That said, in these embodiments, local storage system 105 is maintained within the same cloud environment as the compute 102, whereas the cloud-based storage system 115 is maintained in an external cloud environment. As such, the customer has control of the configuration of the local storage system 105 and is able to configure the local storage system 105 in accordance with the techniques disclosed herein.

For example, the local storage system 105 may include one or more ephemeral and/or volatile storage units, such as random access memory (RAM) units or flash memory units, at which the data associated with the compute 102 is maintained. In embodiments that include RAM units, the RAM units may include static RAM (SRAM) units and dynamic RAM (DRAM) units. The ephemeral and/or volatile storage units are configured to operate as the primary volume for the compute 102. Accordingly, when the instant disclosure refers to the state of the local storage system 105, unless explicitly stated otherwise, this refers to the state of the volatile and/or ephemeral storage of the local storage system 105. During operation, the compute 102 issues read commands to the local storage system 105 to load indicated data into a working memory of the compute 102 and write commands to store new data or modify existing data maintained at the local storage system 105. As is understood to those skilled in the art, volatile storage is associated with higher IOPS than non-volatile storage units. As a result, the compute 102 is able to interact with the data maintained by the local storage system 105 faster than storage systems that implement non-volatile storage, such as the persistent storage systems commonly implemented in cloud-based storage systems.

It should be appreciated that snapshots generally cannot be captured directly from volatile and/or ephemeral storage systems. As it is used herein, a "snapshot" refers to a collection of reference markers that indicate the state of a storage system at a particular point in time. Based on the reference markers, a storage manager can reconfigure a storage system (either the storage system that was snapshotted or a different storage system) to reflect the state indicated by the snapshot. As a result, snapshots are used as both a backup option for a storage system and as a means to port a volume to a different storage system.

To provide this snapshot functionality to the hybrid storage system 112, the storage manager 110 is configured to synchronize changes to the local storage system 105 to the cloud-based storage system 115 and capture snapshots of the cloud-based storage system 115. The cloud-based storage system 115 may be any type of cloud-based storage system. For example, the cloud-based storage system 115 may implement Amazon Elastic Block Storage (EBS), Microsoft Azure Disk Storage, Google Cloud Persistent Disk, or other alternate cloud-based storage structures. Regardless of the underlying storage architecture, to reduce the overhead in synchronizing the changes, it is preferable that the local storage system 105 and the cloud-based storage system 115 utilize the same file system structure that resides on top of the storage structure. One such file system structure supported by both local storage systems and cloud-based storage systems is ZFS.

After the storage manager 110 synchronizes the changes to cloud-based storage system 115, the storage manager 110 may then utilize traditional cloud-based storage snapshotting techniques to generate snapshots 117 of the cloud-based storage system 115. The snapshots 117 are then stored in the snapshot storage 125. While FIG. 1A depicts the cloud-based storage system 115 and the snapshot storage 125 being in separate clouds, in some embodiments, the cloud-based storage system 115 and the snapshot storage 125 are hosted within the same instance associated with a cloud storage provider.

It should be appreciated that because only changes to the local storage system 105 are synchronized to the cloud-based storage system, read operations performed by the compute 102 to the local storage system 105 do not impact the usage of the cloud-based storage system 115. That is, only write operations result in a change in state to the local storage system 105 that needs to be synced to the cloud-based storage system 115. For a read-heavy workload, this results in the IOPS demand on the local storage system 105 being significantly higher than the IOPS demand on the cloud-based storage system 115. Because cloud storage providers typically charge users proportionally to a minimum IOPS requirement, the cloud-based storage system 115 can be hosted by a cloud storage provider at a significantly lower cost than in a conventional arrangement. Even for write-heavy workloads, the write operations to the cloud-based storage system 115 are not integral to compute workload processing and can be processed via a cloud storage environment with a lower IOPS requirement without impacting the IOPS that actually processes the write-heavy workload generated by the compute 102.

Figure 1B:
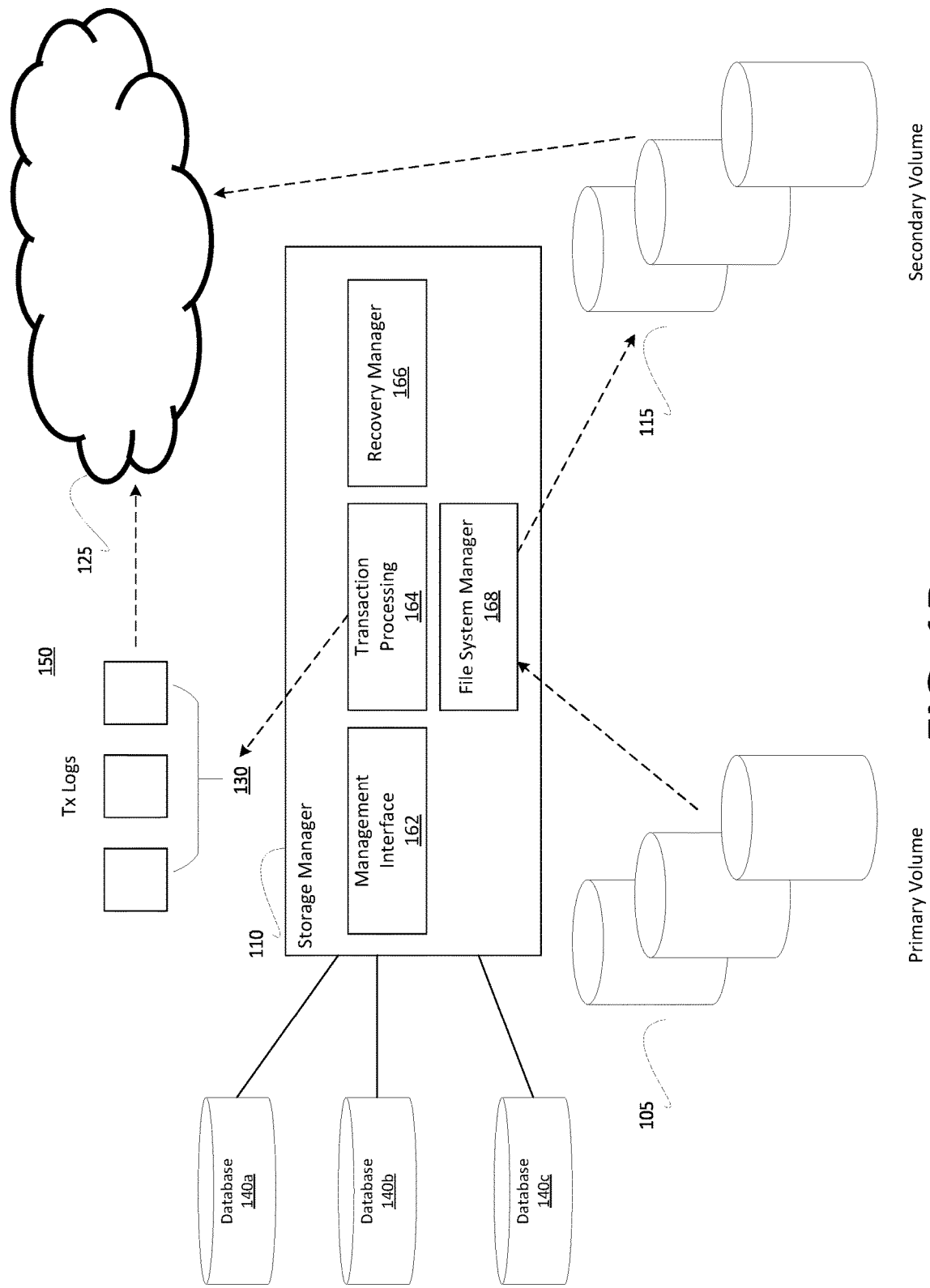
FIG. 1B depicts an example storage manager configured to interface with the components of the example environment of FIG. 1A, according to one embodiment.

As illustrated, the hybrid storage system 112 includes a storage manager 110 to manage the data maintained therewith. It should be appreciated that the data may be structured data, unstructured data, or a combination of both. With simultaneous reference to FIG. 1B, illustrated is an example environment 150 that depicts an example embodiment of the storage manager 110. The storage manager 110 includes a plurality of modules to support the hybrid storage system 112.

A first module is a management interface 162 configured to enable users to set up and manage the hybrid storage system 112. For example, the management interface 162 enables the user to indicate one or more system requirements for the hybrid storage system (e.g., an IOPS requirement, an amount of storage needed, a cloud storage provider, and so on). In response to receiving the system requirements, the management interface 162 causes the storage manager 110 to configure the hybrid storage system 112 in accordance therewith. That is, the storage manager 110 may establish an instance with the indicated cloud storage provider to operate as the cloud-based storage system 115 (the "secondary volume") and pair the established cloud-based storage system 115 with the local storage system 105 (the "primary volume"). As another example, the management interface 162 may enable the user to identify an association between the volumes of the local storage system 105 and the databases 140 associated with the compute 102. The management interface 162 may then cause the storage manager 110 to mount the volumes of the local storage system 105 in accordance therewith.

A second module is a file system manager 168 configured to synchronize the data maintained at the local storage system 105 with the cloud-based storage system 115. More particularly, the file system manager 168 may be configured to detect changes to the local storage system 105 and cause the cloud-based storage system 115 to make the same changes. For example, the file system manager 168 may periodically perform a hash of the data maintained in each block of the local storage system 105 and associate the output hash values with the respective blocks. Accordingly, the file system manager 168 may determine that the data maintained with the block has changed if the output hash value for a given block is different than the hash value previously associated with the block. In response, the file system manager 168 may add the block to a list of pending block updates to synchronize with the cloud-based storage system 115. As another example, the file system manager 168 may obtain a set of transactions performed by the local storage system 105 since the file system manager 168 last synchronized the changes. In response, the file system manager 168 may add the write transaction from the obtained set of transactions to a set of pending transactions to be performed at the cloud-based storage system 115 during the synchronization process.

The file system manager 168 may be configured to synchronize the pending data changes in response to detecting an event that a snapshot of the local storage system 105 is to be captured. For example, the management interface 162 may enable the user to manually indicate that a snapshot is to be captured of the local storage system 105. In response, the file system manager 168 instantiates one or more synchronization workers to write the changes indicated in the pending list of block updates to the cloud-based storage system 115.

It should be appreciated that if the file system manager 168 is configured to wait until receiving a user indication to capture a snapshot before synchronizing the pending data changes to the cloud storage 115, the amount of pending data changes may accumulate to a size such that it takes a significant amount of time (e.g., 5 minutes, 10 minutes, 30 minutes, or more) to complete the synchronization process. Thus, the process of bringing the cloud-based storage system 115 to the same state as the local storage system 105 at the time the snapshot was requested by the user may cause an unacceptable delay to process of snapshotting the local storage system 105. This is a particular concern for ephemeral and/or volatile storage system, such as the local storage system 105, because if the ephemeral and/or volatile storage system experiences an outage, the data maintained thereat is lost. Thus, if local storage system 105 experiences a failure during the time it takes to synchronize the changes to the cloud-based storage system 115, the file system manager 168 may be unable to synchronize the cloud-based storage system 115 to the snapshotted state to be able to capture the requested snapshot (without implementing the data loss prevention techniques described below).

To reduce the time that it takes to synchronize the data changes to the cloud-based storage system 115, the file system manager 168 may also be configured to perform opportunistic synchronization of the pending data changes. Accordingly, the file system manager 168 may be configured to analyze the pending data changes and/or the state of the hybrid storage system 112 to determine when to initiate one or more opportunistic synchronization processes. By performing the opportunistic synchronization of the pending data changes, the file system manager 168 ensures that when a user does indicate that a snapshot of the local storage system 105 is to be captured, the file system manager 168 is able to synchronize the pending data changes in a reasonable time (e.g., under five minutes, under two minutes, under a minute, and so on) to reduce the likelihood of a data loss event impairing the generation of the snapshot. Regardless, after the file system manager 168 determines that the pending data changes have all been synchronized to the cloud-based storage system 115, the file system manager 168 may cause the cloud-based storage system 115 to generate a snapshot thereof and store the snapshot 117 in the snapshot storage 125.

It should be appreciated that the process of generating the snapshot of the cloud-based storage system 115 may also take a significant amount of time. To this end, the process of generating the snapshot typically involves creating a backup copy of the cloud-based storage system 115. Accordingly, to capture the snapshot of the cloud-based storage 115, the pending data changes that are synchronized to the cloud-based storage system 115 also need to be synchronized to the backup copy to generate the corresponding reference markers included in the snapshot. During this synchronization process, the storage manager 110 is unable to convert the snapshot back into a volume to use as part of restore process. In some scenarios, the process of generating the snapshot may take multiple hours. Thus, the actual process of generating the snapshot may significantly delay the time until the customer can use the snapshot.

Accordingly, to reduce the time in capturing the snapshot, the file system manager 168 may also be configured to capture incremental snapshots of the cloud-based storage system 115. That is, for any incremental data changes (e.g., data changes to write new data, as opposed to modifying existing data), the file system manager 168 may write the incremental data changes to a new location in the backup storage and generate an incremental snapshot that references the new location. Thus, when a user requests the capture of a new snapshot, the incremental data changes already captured in an incremental snapshot do not need to be processed, greatly reducing the amount of time needed to capture the snapshot. In some scenarios, the incremental snapshot processing can reduce the snapshot pendency from multiple hours to just a few minutes (or less).

Moreover, because the snapshot includes references to the underlying data, not the data itself, when a second incremental snapshot is generated, both the first incremental snapshot and the second incremental snapshot will reference the same location for a given block of data. Thus, the first incremental snapshot can be deleted without data loss. Because cloud storage providers often charge based on a number of snapshots stored, the ability to delete incremental snapshots without data loss enables the file system manager 168 to reduce the snapshot pendency time without incurring significant costs.

As illustrated, the storage manager 110 also includes a third module, a recovery manager 166 configured to restore the local storage system 105 to a state indicated by a snapshot stored in the snapshot storage 125. For example, a user may want to restore the local storage system 105 to a state reflected by a snapshot 117, such as in response to a failure at the local storage system 105 or to debug an issue with the compute 102. As another example, the user may want to copy a volume to a different database 140. Thus, the restore event may indicate that a different storage unit is to be restored to the state reflected by the snapshot than the one via which the snapshot was captured. The restore process performed by the recovery manager 166 is described in more detail below.

In some embodiments, to prevent data loss from occurring in the event of a failure of the local storage system 105 during a synchronization process, the storage manager 110 also includes a transaction processing module 164 configured to maintain a transaction log 130 of transactions processed (and/or to be processed) by the local storage system 105. To ensure that the transaction logs 130 are not erased upon a system failure, the transaction processing module 164 may be configured to store the transactions logs 130 in a durable storage associated with the local storage system 105. To reduce the cost of maintaining durable storage, the amount of storage in the durable storage of the local storage system 105 is significantly smaller than the amount of volatile storage of the local storage system 105. As such, the durable storage may be configured to only store transaction logs that correspond to a rolling time window (e.g., 10 minutes, 20 minutes, one hour). In some embodiments, to provide additional storage of the transaction logs 130, the transaction processing module 164 may also be configured to chunk the transaction log 130 into blocks for storage in the same cloud environment as the cloud-based storage system 115.

In the event of a system failure while synchronizing the local storage system 105 with the cloud-based storage system 115 to capture a snapshot thereof, the transaction processing module 164 is able to identify a time stamp associated with the snapshot. When the recovery manager 166 restores the local storage system 105 to the state indicated by the most recent successfully-captured snapshot, the transaction processing module 164 may then re-process the identified set of transactions at the local storage system 105 to return the state of the local storage system 105 to the state at the time of the failed snapshot request. At this point, the file system manager 168 re-attempts the synchronization process to bring the state of the cloud-based storage system 115 to the state of the local storage system 105 at the time of the requested snapshot.

Figure 2:
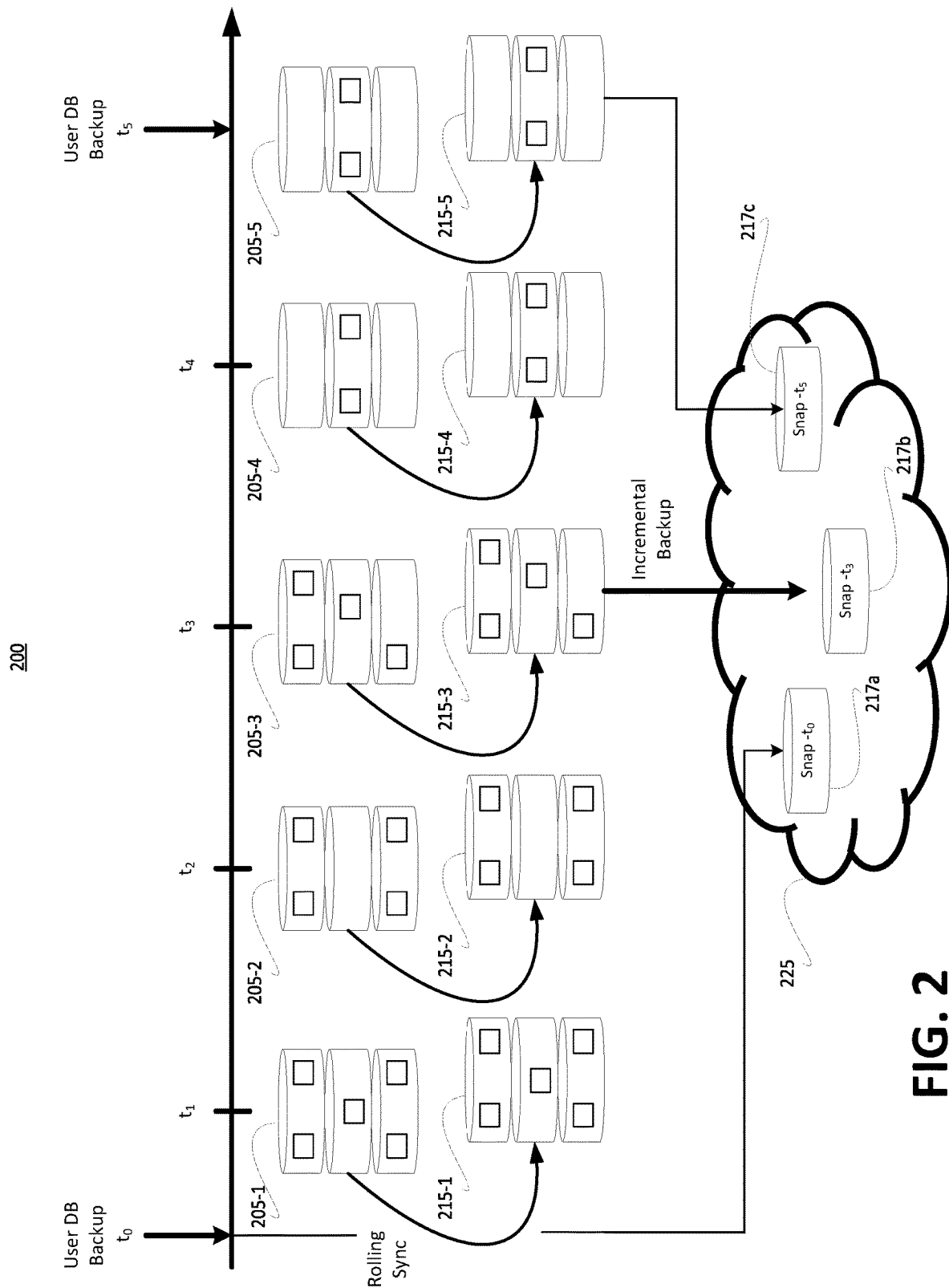
FIG. 2 depicts an example time lapse of a snapshot process performed in accordance with the disclosed techniques.

FIG. 2 depicts an example time lapse 200 of a snapshot process performed in accordance with the disclosed techniques. More particularly, the time lapse 200 depicts how a storage manager, such as the storage manager 110 of FIGS. 1A-1B, synchronizes data changes to a local storage system 205, such as the local storage system 105 of FIGS. 1A-1B, to a cloud-based storage system 215, such as the cloud-based storage system 115 of FIGS. 1A-1B.

As illustrated, the time lapse 200 begins at time to when the storage manager detects an event indicating that the local storage system 205 is to be backed up. That is, the storage manager detected an event indicating that the storage manager is to capture a snapshot of the state of the local storage system 205 at time to. In response, the storage manager begins the process of synchronizing the state of the local storage system 205 to the cloud-based storage system 215.

When the synchronization process completes, the storage manager captures a snapshot 217a of the cloud-based storage system 215 and stores the snapshot 217a at a snapshot storage 225, such as the snapshot storage 125 of FIGS. 1A-1B.

After detecting the event indicating that the local storage system 205 is to be backed up, the storage manager continues to monitor the local storage system 215 to detect any data changes that need to be synchronized the cloud-based storage system 215. As illustrated, the storage manager may synchronize the pending changes to the state of the local storage system 205 on a rolling basis. As described above, by synchronizing the cloud-based storage system on a rolling basis, when the storage manager detects another event indicating that a snapshot is to be captured (e.g., at time $t_5$), there are fewer pending changes to synchronize, reducing the overall amount of time it takes to complete the snapshot process from the time the event is detected.

In some embodiments, the storage manager performs the rolling synchronization on an opportunistic basis. Additionally or alternatively, the storage manager may perform the rolling synchronizations on a periodic basis (e.g., every 2 minutes, every 5 minutes, every 10 minutes). In embodiments that implement both, the periodic synchronization may act as a maximum rolling sync window, and the storage manager may initiate a synchronization process earlier if an opportunistic synchronization condition is satisfied before the period expires. Accordingly, to determine whether to perform an opportunistic synchronization, the storage manager may be configured to generate a metric characterizing the state of the local storage system 205 and the pending data changes. When the metric satisfies a threshold value, the storage manager may opportunistically initiate a rolling sync process to synchronize the pending data changes. In the time lapse 200, this occurs at times $t_1$, $t_2$, $t_3$, and $t_4$.

In some embodiments, the storage manager may implement heuristic techniques to generate the metric based upon an evaluation of a plurality of parameters. Generally, the heuristic metric evaluates an estimated amount of time it takes to complete a synchronization process based upon a volume of data changes and the availability of processing resources. To this end, the amount of data that can be synchronized at any given time changes based on dynamic conditions of the compute and/or the local storage system 205. That is, if the local storage system 205 needs to dedicate a larger percentage of processing resources to processing the workload from the attached compute, then there are fewer resources available for the synchronization process, causing the synchronization to take longer to complete. At the same time, if there are few data changes to synchronize, the storage manager may still be able to quickly complete the synchronization process.

To evaluate a volume of data changes, the heuristic metric may include a factor indicative of a time to perform the currently pending data changes that need to be synchronized to the cloud-based storage 215. In some embodiments, the metric includes a factor indicative of an overall amount of data changes that need to be synchronized (e.g., a number of blocks that changed, an overall size of changed blocks, a number of pending transactions to perform). Generally, the greater the amount of data changes, the longer it takes for the storage manager to perform the corresponding data changes to the cloud-based storage 215 such that the cloud-based storage 215 reflects the state of the local storage 205. In some embodiments, the storage manager may analyze the individual data changes (e.g., changed blocks, pending transactions) to estimate a time to perform the individual data changes at the cloud-based storage system 215 and aggregate the individual values to determine an aggregate time estimate.

Additionally, for many storage systems, the amount of data changes generally exhibits time-based trends. For example, as the local storage system 205 is used over time, the overall amount of data changes (either by modifying existing data or incrementally adding new data) synchronized to the cloud-based storage system 215 typically increases. The percentage by which this occurs is generally referred to as data churn. The storage manager may calculate data churn as a rolling average (e.g., a five day average, a ten day average), using a regression technique based upon previous historical churn data, or other techniques that infer a current data churn. Accordingly, when the heuristic metric evaluates the amount of data changes, the heuristic metric may evaluate the amount of data changes relative to the average amount of data churn.

To evaluate processing resource availability, the heuristic metric may include one or more factors based upon current processor usage for the attached compute. If a large amount of the compute resources are in use, then the storage manager may have relatively few compute resources to perform the synchronization task. Another factor may be based upon data throughput for a synchronization worker (e.g., a thread, task, pod, etc.) that is currently running. To this end, if the data throughput is above a threshold value, the storage manager may determine that processor availability is not significantly constraining the synchronization process.

While the above describes a heuristic metric that evaluates instanteous conditions of the local storage system 205 and/or the attached compute as factors, the heuristic metric may also be configured to evaluate expected conditions of the local storage system 205 and/or the attached compute. To this end, if the storage manager determines that there is an expected increased demand on processor resources, then the heuristic metric may determine that the synchronization process should be initiated sooner to leverage the current processor availability and to prevent the volume of pending data changes from growing too large. On the other hand, if the storage manager determines that a current heavy workload condition will alleviate soon, the heuristic metric may determine that the synchronization process should be initiated later to preserve resources for workload processing.

To determine the expected dynamic conditions, the storage manager may be configured to analyze a queue of pending transactions to generate additional factors evaluated by the heuristic metric. For example, the heuristic metric may evaluate a pending transaction volume, a proportion of read transactions to write transactions in the queue, an amount of data accessed and/or modified by the pending transactions.

Regardless of how the metric is calculated, when the metric reaches a threshold value, the storage manager may initiate a synchronization process for the pending data changes. For example, at time $t_2$ in the time lapse 200, the storage manager determines that, based in part upon the data changes since time $t_1$, the heuristic metric indicates that the state of local storage system 205 at time $t_2$ (i.e., state 205-2) is to be synchronized to the cloud-based storage 215. In embodiments where the pending data changes are maintained as blocks that have been changed, synchronizing the changes involves copying the data from the block on the local storage system 205 to the corresponding block at the cloud-based storage system 215. In embodiments where the pending data changes are maintained as transactions, the storage manager may route the pending transactions to the cloud-based storage system 215 for processing thereat.

In addition to determining when to initiate a rolling synchronization, a heuristic metric may also be applied to determine a number of workers assigned to synchronization task. For example, if the heuristic metric identifies that there is a low demand on processor usage for the attached compute, then the storage manager may instantiate two or more workers (e.g., threads, tasks, etc.) to synchronize the changes. In some embodiments, the storage manager implements an autoscaler that dynamically allocates workers to the synchronization task. In these embodiments, the autoscaler may calculate the heuristic metric used to determine the number of synchronization workers. By using a heuristically-derived number of workers, the storage manager is able to synchronize the data changes to the cloud-based storage system 215 in an expedient manner without significantly constraining the ability of the local storage system 205 to process the workload generated by the attached compute.

As described above, to reduce the amount of time it takes to provide the customer a snapshot, the storage manager may also be configured to generate incremental snapshots. Accordingly, the storage manager may be configured to monitor a state of the cloud-based storage system 215 to determine an amount of incremental data changes to cloud-based storage system 215 since a snapshot (including an incremental snapshot) was captured. In some scenarios, the storage manager may then estimate an amount of time needed to synchronize the incremental data changes, and if the time exceeds a threshold amount of time, the storage manager initiates an incremental snapshot. In other scenarios, the storage manager may evaluate an amount of incremental data changes relative to a size of the cloud-based storage system, and if the relative size exceeds a threshold value, the storage manager initiates an incremental snapshot.

Moreover, because the incremental snapshot is still a snapshot, the incremental snapshot can be used to restore the local storage system 205 in the event of a failure thereat. As described in more detail below, in order to prevent data loss when a failure at the local storage system 205 occurs, the storage manager is configured to restore the local storage system 205 using a most recent snapshot and replay the transaction that were processed by the local storage system 205 after the snapshot process was initiated up until the failure occurred. However, if the most recent snapshot is fairly old (e.g., older than 10 minutes, 30 minutes, 1 hour, etc.), then it may take a long time to re-process the transactions to bring the state of the local storage system 205 to the state at the time of the crash. Thus, to reduce downtime of the local storage system 205 when a failure occurs, the storage manager may be configured to monitor an amount of data changes that have occurred since the previous snapshot to estimate an amount of time it would take to restore the local storage system 205 using the most recent snapshot. The amount of data changes since the most recent snapshot may be measured in terms of a number of write transactions that occurred, a volume of data modified, an amount of data churn, or another metric indicative of an amount of time to re-process the transactions. In the time lapse 200, this occurs after time $t_3$ when the cloud-based storage system 215 reflects the state 215-3 and the storage manager determines that an incremental snapshot 217b of the cloud-based storage system 215.

The storage manager may proceed to automatically perform rolling syncs and capturing snapshots while the local storage system 205 is in operation. Accordingly, when the storage manager detects another user-initiated request to generate a snapshot of the local storage (e.g., at time $t_5$), the storage manager is able to capture the snapshot more quickly and with a shorter recovery time in the event of a failure at the local storage system 205. That is, because at time $t_5$ the state 215-4 of the cloud-based storage system 215 already reflects the data changes that occurred from time $t_0$ to $t_4$, only the data changes that occurred from $t_4$ to $t_5$ need to be synchronized before the storage manager can initiate the snapshot capture. Additionally, because the storage manager automatically generated the incremental snapshot 217b, the incremental data changes from time $t_0$ to $t_3$ are already captured in the incremental snapshot 217b, the storage manager is able to more quickly capture the snapshot of the cloud-based storage system 215. To this end, rather than generating a new snapshot, the storage manager may be configure to update the incremental snapshot 217b to include any additional pending data changes not captured in the incremental snapshot 217b. This may include any pending modification data changes since time to or any new incremental data changes since time $t_3$.

It should be appreciated that due to the time to actually synchronize the state of the local storage system 205 to the cloud-based storage system 215, the state 215-5 of the cloud-based storage system 215 is attained at some point after time $t_5$. That is, the time when the user indicates that the snapshot is to be captured does not match the time at which the snapshot of the state 215-5 of the cloud-based storage system 215 is actually captured. Accordingly, to avoid user confusion, the storage manager may associate the snapshot 217c with an indication of the time the local storage system 215 exhibited the state 215-5 that is reflected by the snapshot 217c. Thus, when the storage manager provides a user interface that enables the user to select a snapshot to use during a restore process, the user interface can provide a time associated with the state of the user-facing local storage system 205, not the back-end cloud-based storage system 215.

Figure 3:
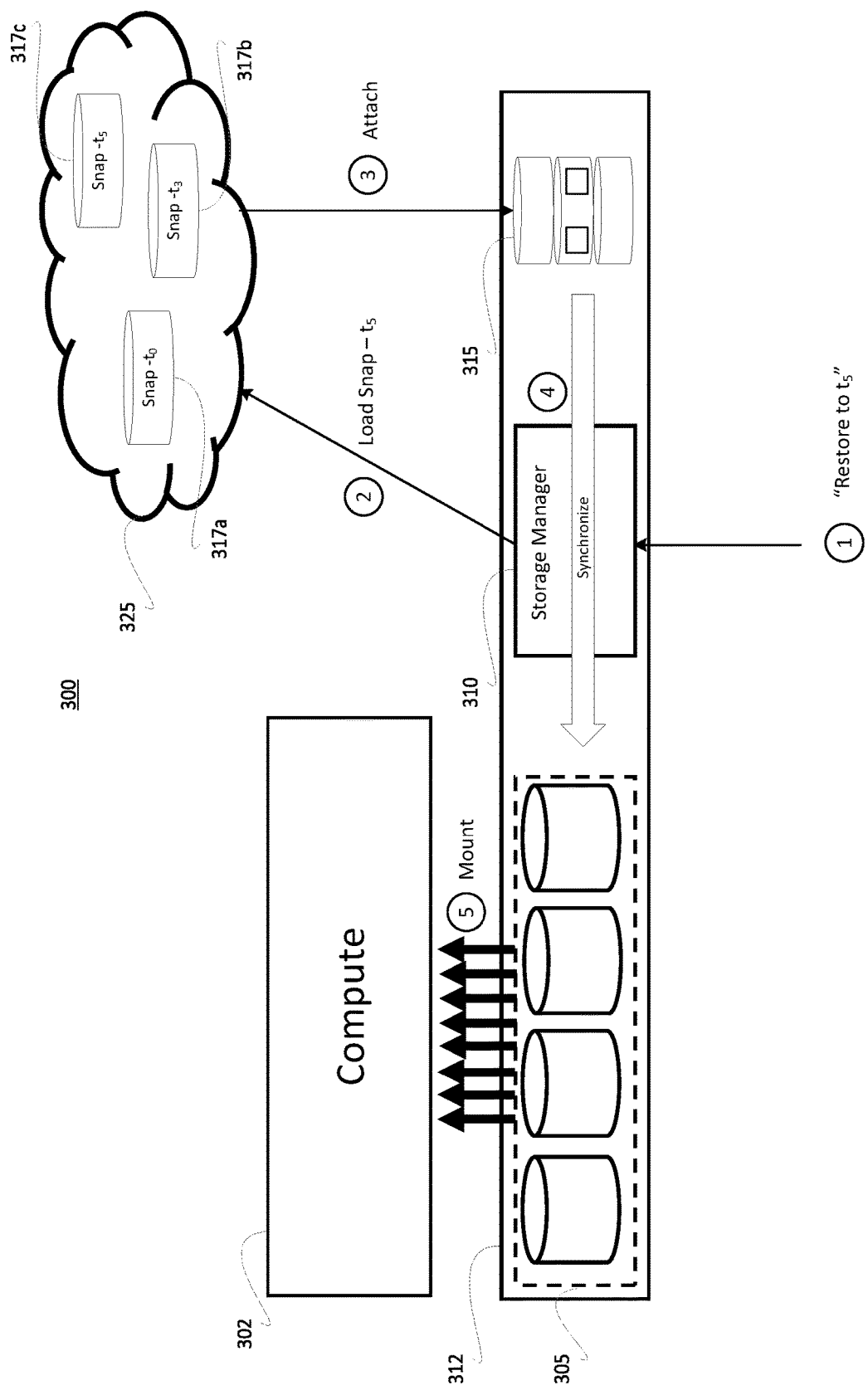
FIG. 3 depicts an example process via which a snapshot is used to restore a local storage system, in accordance with the disclosed techniques.

Turning now to FIG. 3, illustrated is an example process 300 via which a snapshot 317 (such as the snapshots 117, 217) is used to restore a local storage system 305 (such as the local storage systems 105, 205), in accordance with the disclosed techniques. The local storage system 305 is paired with a cloud-based storage system 315 (such as the cloud-based storage systems 115, 215) as part of a hybrid storage system 312 (such as the hybrid storage system 112). The hybrid storage system 305 also includes a storage manager 310 (such as the storage manager 110) that manages the hybrid storage system 312. Additionally, the local storage system 305 is attached to a computer 302 (such as the compute 102).

As illustrated, the process 300 begins when the storage manager 310 detects (1) an event indicating that the local storage system 305 is to be restored to the state of the local storage system at time $t_5$. To this end, the hybrid storage system 312 may be configured to store a plurality of cloud snapshots 317 in a cloud snapshot storage 325 (such as the cloud snapshot storage 125). A recovery manager of the storage manager (such as the recovery manager 166) may be configured to present a recovery user interface that enables the user to restore the local storage system 305 to the states captured by the snapshots 317 stored at the cloud snapshot storage 325. Accordingly, the event may be generated in response to a user interacting with recovery user interface to manually indicate that the local storage system 305 is to be restored using the snapshot 317c that captured the state of the local storage system 305 at time $t_5$. In some embodiments, this user interface also does not enable the user to select any incremental snapshots that may have been automatically captured by the storage manager.

Alternatively, the event may be generated in response to detecting that the local storage system 305 has started up. To save on energy costs, the local storage system 305 may be powered off when there is no workload to process. However, as described herein, because the local storage system 305 implements volatile and/or ephemeral storage units, when the local storage system 305 is powered off, the data is lost. When the local storage system 305 subsequently starts up again, there is no stored user data. Accordingly, in this scenario, the storage manager 310 may be configured to identify a most recent snapshot 317 stored at the cloud snapshot storage 325 (e.g., a snapshot captured after completing a workflow at the local storage system 305) to restore the state of the local storage system 305 at the time when the local storage system 305 was intentionally powered off. Alternatively, the local storage system 305 may have experienced a failure and needs to be restored to the most recent snapshot as part of a data recovery process. In either scenario, the event requesting that the local storage system 305 be restored to time is may be generated by the startup process for the local storage system 305.

In response, the storage manager 310 indicates (2) to the cloud snapshot storage 325 that the snapshot 317c corresponding to the state of the local storage system 305 at time $t_5$ is to be restored to the cloud-based storage system 315. In the illustrated embodiment, the storage manager 310 communicates directly with the cloud snapshot storage 325. In other embodiments, the storage manager 310 transmits a restore request to the cloud-based storage system 315 with an indication of the snapshot 317c and the cloud-based storage system 315 interfaces directly with cloud snapshot storage 325.

After retrieving the indicated snapshot 317c from the cloud snapshot storage 325, the cloud-based storage system 315 attaches (3) the snapshot 317c thereto. The cloud-based storage system 315 may be configured to use the typical snapshot restoration techniques for the cloud storage provider at which the cloud-based storage system 325 is provided to process actions associated with steps (2) and (3) of the process 300.

Once the storage manager 310 detects that the cloud-based storage system 315 is restored, the storage manager 310 may then synchronize (4) the state of the cloud-based storage system 315 to the local storage system 305. That is, the storage manager 310 may configure the state of the local storage system 305 such that it reflects the state of the cloud-based storage system 315.

After the synchronization is complete, the storage manager 310 then mounts (5) the local storage system 305 to the compute 302 to begin processing a workload. It should be appreciated that in some embodiments, the local storage system 305 may be mounted to the compute 302 prior to completing the synchronization. In these embodiments, the storage manager 310 may prevent the local storage system 305 from processing any transaction in a transaction queue until the synchronization is complete. Regardless, after the local storage system 305 is mounted to the compute 302 and is ready to start processing the corresponding workload, the storage manager 310 may be configured to perform the rolling synchronization and automated backup techniques described with respect to FIG. 2.

Figure 4:
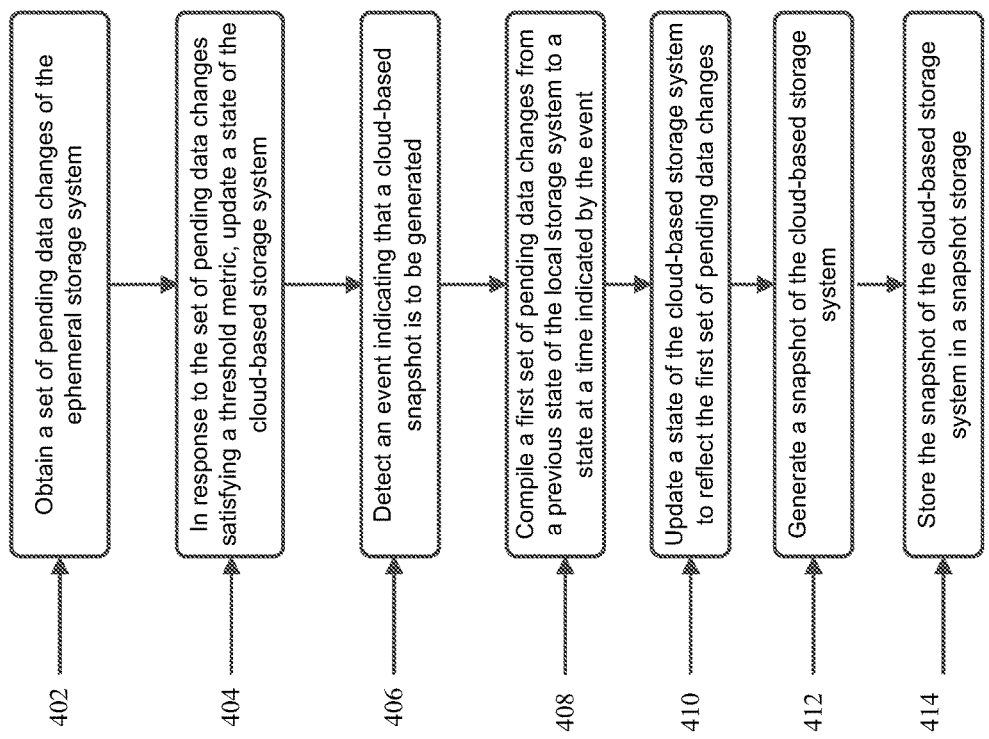
FIG. 4 depicts a flow diagram of an example method for providing a snapshot capability to a local storage system, according to one embodiment.

FIG. 4 depicts a flow diagram of an example method 400 for snapshotting a local storage system in accordance with the techniques described herein. The method 400 may be performed by a storage manager (such as the storage managers 110, 310). Accordingly, the storage manager may include a first network interface communicatively coupled to an ephemeral storage system (such as the local storage systems 105, 205, 305) and a second network interface communicatively coupled to a cloud-based storage system (such as the cloud-based storage systems 115, 215, 315). To perform the various actions described with respect to the method 400, the storage manager may be configured to execute a set of computer-readable instructions via one or more processors.

The method 400 begins at block 402 when the storage manager obtains a set of pending data changes of the ephemeral storage system. That is, the storage manager obtains a set of data changes that have occurred to the ephemeral storage system that have not yet been synchronized to the cloud-based storage system. Accordingly, the data changes indicate changes to a state of the ephemeral storage system from a previous state (e.g., when a previous synchronization occurred).

In some embodiments, to obtain the set of data changes, the storage manager inputs the data maintained in a block of the ephemeral storage system into a hash function to generate a hash value for the block. If the storage manager detects that the hash value for the block has changed from a previous hash value for the block, the storage manager may include the block in the set of pending data changes. Additionally or alternatively, the storage manager may be configured to obtain a set of transaction performed by the ephemeral storage system since beginning the update of the state of the cloud-based storage system to reflect the previous state of the ephemeral storage system.

At block 404, the storage manager determines a metric associated with the set of pending data changes. In response to the set of pending data changes satisfying a threshold metric, the storage manager updates a state of the cloud-based storage system to reflect the changes to the state of the ephemeral storage system indicate indicated by the set of pending data changes. In some embodiments, the metric is a heuristic-based metric based on or more of the following factors: a number blocks changed by the set of pending data changes, processor usage for a compute (such as the computes 102, 302) to which the ephemeral storage system is mounted, a processing speed for a synchronization worker, a time mapping of data churn at the ephemeral storage system, a volume of transactions to be processed by the ephemeral storage system, and proportion of read transaction to write transaction in the transactions to be processed. In some embodiments, the threshold metric is a time value indicating an amount of time that has elapsed since beginning the update of the state of the cloud-based storage system to reflect the previous state of the ephemeral storage system.

At block 406, the storage manager detects an event indicating that a cloud-based snapshot is to be generated. In some embodiments, the event may be an event indicative of a user-directed snapshot request. Additionally or alternatively, the event may be automatically generated. In these embodiment, the storage manager may be configured to generate incremental cloud snapshots that reflect the sets of pending data changes that have occurred since generating a prior snapshot of the cloud-based storage system. For example, storage manager may determine a data churn metric (e.g., an amount of data churn since a prior incremental snapshot) and, in response to the data churn metric satisfying a threshold value, automatically generate the incremental cloud snapshot.

At block 408, the storage manager compiles a first set of pending data changes that indicates changes to the state of the ephemeral storage system from a previous state of the ephemeral storage system to a state at a time indicated by the event.

At block 410, the storage manager updates a state of the cloud-based storage system to reflect the changes to the state of the ephemeral storage system indicated by the first set of pending data changes. In some embodiments, the storage manager instantiates two or more workers (e.g., threads, tasks, pods, etc.) to synchronize the data changes in parallel. For example, the storage manager may be configured to analyze a heuristic-based metric to determine a number of workers to be instantiated to synchronize the pending data changes.

At block 412, the storage manager determines that the pending data changes have been synchronized and generates a snapshot of the cloud-based storage system. In embodiments where the storage manager generates an incremental cloud snapshots, the snapshot generated at block 412 may be generated by updating a most recent incremental cloud snapshot using the first set of pending data changes, as opposed to capturing an entirely new snapshot. At block 414, the storage manager stores the snapshot of the cloud-based storage system in a cloud snapshot storage (such as the snapshot storage 125, 225, 325).

After the snapshot is stored in the cloud snapshot storage, the snapshot is available for use when restoring the ephemeral storage system. Accordingly, the storage manager may be configured to detect an event indicating that the ephemeral storage system is to be restored to a state associated with the snapshot of the cloud-based storage system. In some embodiments, the event indicating the ephemeral storage system is to be restored in an event indicative of a user-initiated restore request. Alternatively, the event indicating the ephemeral storage system is to be restored is automatically generated upon startup of the ephemeral storage system. It should be appreciated that due to the delay in performing the synchronization, the event may indicate a time at which the first set of pending data changes was compiled, not when snapshot of the cloud-based storage system was captured.

As part of the restoration process, in some embodiments, the storage manager is configured to first restore the cloud-based storage system using the snapshot of the cloud-based storage system. Then, the storage manager may synchronize the system of the ephemeral storage system to reflect the state of the restore cloud-based storage system. In some embodiments, the ephemeral storage system is included in a local transactional storage system that also includes a durable segment configured to store a transaction log of transactions performed by the ephemeral storage system. In these embodiments, the event indicating that the ephemeral storage system is to be restored may be automatically generated upon startup of the ephemeral storage system after detecting a failure at the ephemeral storage system (for example, when updating the state of the cloud-based storage system in response to detecting the event indicating that the cloud-based snapshot is to be generated). In response, the storage manager may be configured to identify a set of transaction in the transaction log that occurred after the event indicating that the cloud-based snapshot is to be generated and, subsequent to restoring the ephemeral storage system, perform the identified set of transaction at the ephemeral storage system.

Data Loss Prevention

As described above, there is a delay between when user manually indicates and/or the system automatically determines that a snapshot of the state of the local storage system is to be captured and when the pending changes to the local storage system are synchronized to the cloud-based storage system such that a cloud snapshot of the requested state can be captured. As such, due to the use of volatile and/or ephemeral storage to maintain the user data, if the local storage system experiences a failure, then the hybrid storage system loses any pending changes that have not yet synchronized to the cloud-based storage system. As a result, the requested snapshot cannot be captured. To prevent this type of data loss, many conventional storage systems attach the compute directly to a durable cloud-based storage system.

Instead, to maintain the high IOPS associated with the ephemeral and/or volatile storage at a local storage system while preventing data loss from occurring, the local storage system may be implemented as a transactional storage system. This means that as local storage system processes transactions, the recently performed transaction are maintained in a transaction log. It should be appreciated that to avoid also losing the transaction logs upon a failure at the local storage system, the hybrid storage system may instead store the transaction log in a durable storage. Because the transactional log is not used to process workload from the compute, the slower IOPS of durable storage does not constrain workload processing. Additionally, while durable storage is typically more expensive than volatile and/or ephemeral storage, the amount of storage needed to maintain a transaction is usually orders of magnitude less than the amount of storage needed to maintain the user data associated with the attached compute. Thus, the additional cost associated with maintaining the transaction log in durable storage does not offset the cost savings for storing the user data in ephemeral and/or volatile storage.

Figure 5A:
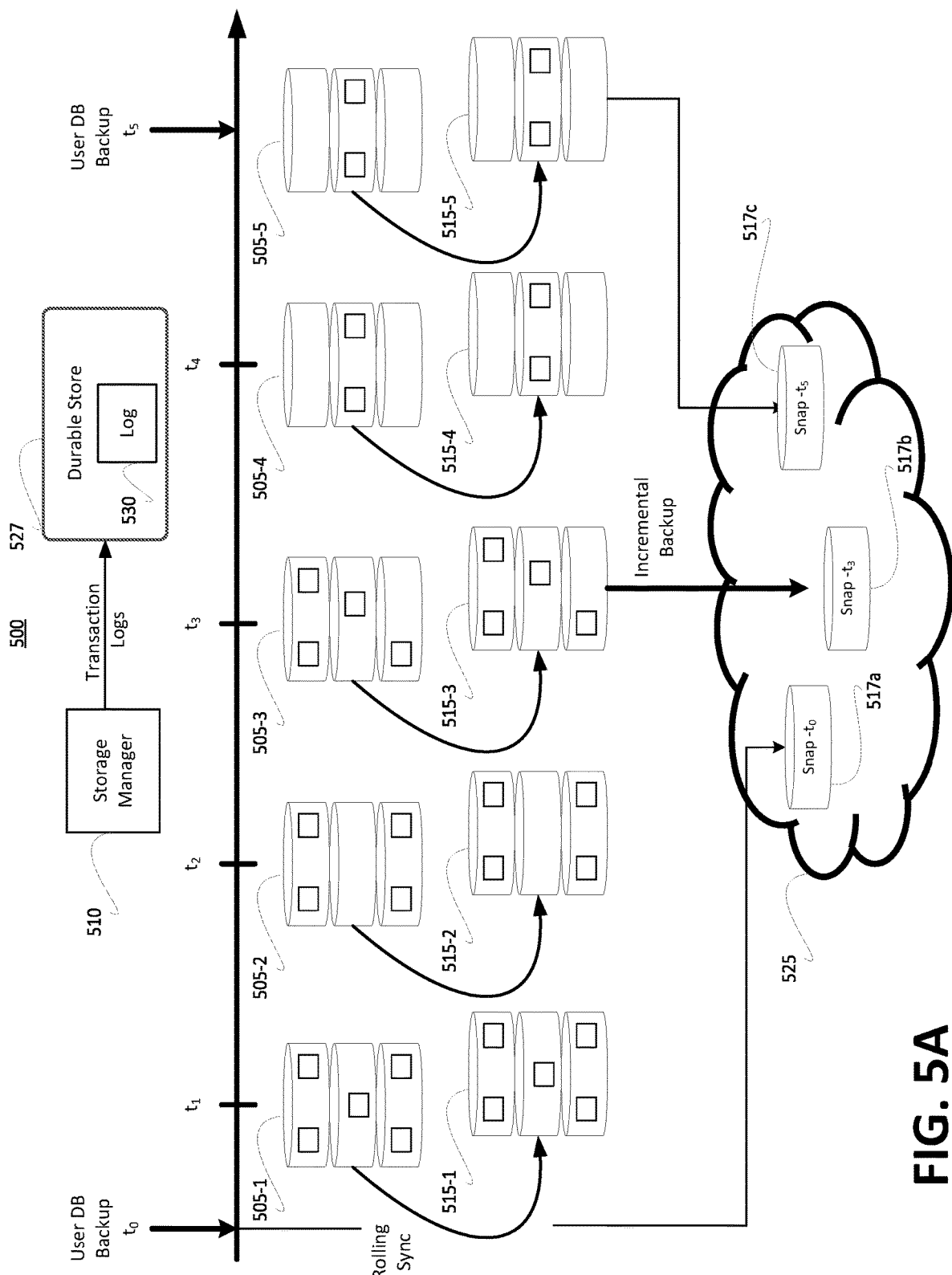
FIG. 5A depicts an example time lapse of a snapshot process performed using transaction logging techniques, in accordance with the disclosed techniques.

Turning to FIG. 5A, illustrated is an example time lapse 500 of a snapshot process that includes transaction logging in accordance with the disclosed techniques. More particularly, the time lapse 500 depicts how a storage manager 510 (such as the storage managers 110, 310), synchronizes data changes to a local storage system 505 (such as the local storage systems 105, 205, 305) to a cloud-based storage system 515 (such as the cloud-based storage systems 115, 215, 315). Generally, the data synchronization processes from time $t_0$ to time is depicted in the time lapse 500 occurs in the same manner as the data synchronization processes from time $t_0$ to time is depicted in the time lapse 200 and described with respect to FIG. 2. Accordingly, a cloud snapshot storage 525 (such as the cloud snapshot storage 125, 225, 325) may store cloud snapshots 517a, 517b, and 517c (which correspond to the cloud snapshots 217a, 217b, 217c).

In addition to synchronizing the state of the cloud-based storage system 515 with the state of the local storage system 505, the storage manager 510 also maintains a transaction log 530 at a durable storage 527. Accordingly, as the local storage system 505 processes the transactions, an indication of the processed transaction is added to the transaction log. The indication include a time stamp indicating the time at which the transaction was processed, an indication of whether the transaction was successfully processed and/or an error code indicating a particular failure, an address at the local storage system 505 at which data related to the transaction is maintained, and/or other information related to the transaction.

The storage manager 510 may configure the durable storage 527 of the local storage system 505 in accordance with one or more user requirements. In some embodiments, the storage manager 510 interfaces with the cloud storage provider for the local storage system 505 to request the durable storage resources that comply with the user requirements to use as the durable storage 527. The storage manager 510 may then configure local storage system 505 with an address of the durable storage 527 such that the local storage system 505 knows where to write the transactions that form the transaction log 530.

According to aspects, one user requirement may include the size of the durable storage 527 (e.g., a number of transactions, a rolling window size, and so on). Preferably, the size requirement ensures that the maximum number of transactions included in the transaction log is sufficient to include all of the transactions that occurred since a previous snapshot was captured. As such, during the event of a failure at ephemeral and/or volatile storage of the local storage system 505 during a snapshot synchronization process, the storage manager 510 is able to playback the transactions from the transaction log to return the state of the local storage system 505 to the state associated with the snapshot.

In some embodiments, the size of the durable storage 527 is dynamically scaled based to ensure that the transaction log 530 is able to accommodate all of the transactions that occur since the previous snapshot. For example, if the transaction log 530 includes a threshold percentage of the maximum number of transactions that can be stored at the durable storage 527 have occurred since capturing a previous snapshot (e.g., 80%, 90%), then the storage manager 510 may be configured to temporarily increase the size of the durable storage 527.

Additionally, or alternatively, the storage manager 510 may use the state of the transaction log 530 as a factor upon which the storage manager 510 determines to automatically capture a snapshot (e.g., the snapshot of the state 505-3). To this end, based upon a transaction volume, a proportion of write transaction to read transactions, an amount of data churn, and/or a throughput of the synchronization workers, the storage manager 510 may determine a heuristic indicative of whether the transaction log 530 can accommodate the additional transactions that will occur during the time it currently takes to synchronize the state of the local storage system 505 to the cloud-based storage system 515 without discarding any transactions since a most recent snapshot was captured. Accordingly, if the heuristic indicates that the transaction log 530 may be unable to accommodate the future transactions without discarding transactions needed to restore the state of the local storage system 505 in the event of a failure, then the storage manager 510 may automatically initiate the snapshot capture process.

Figure 5B:
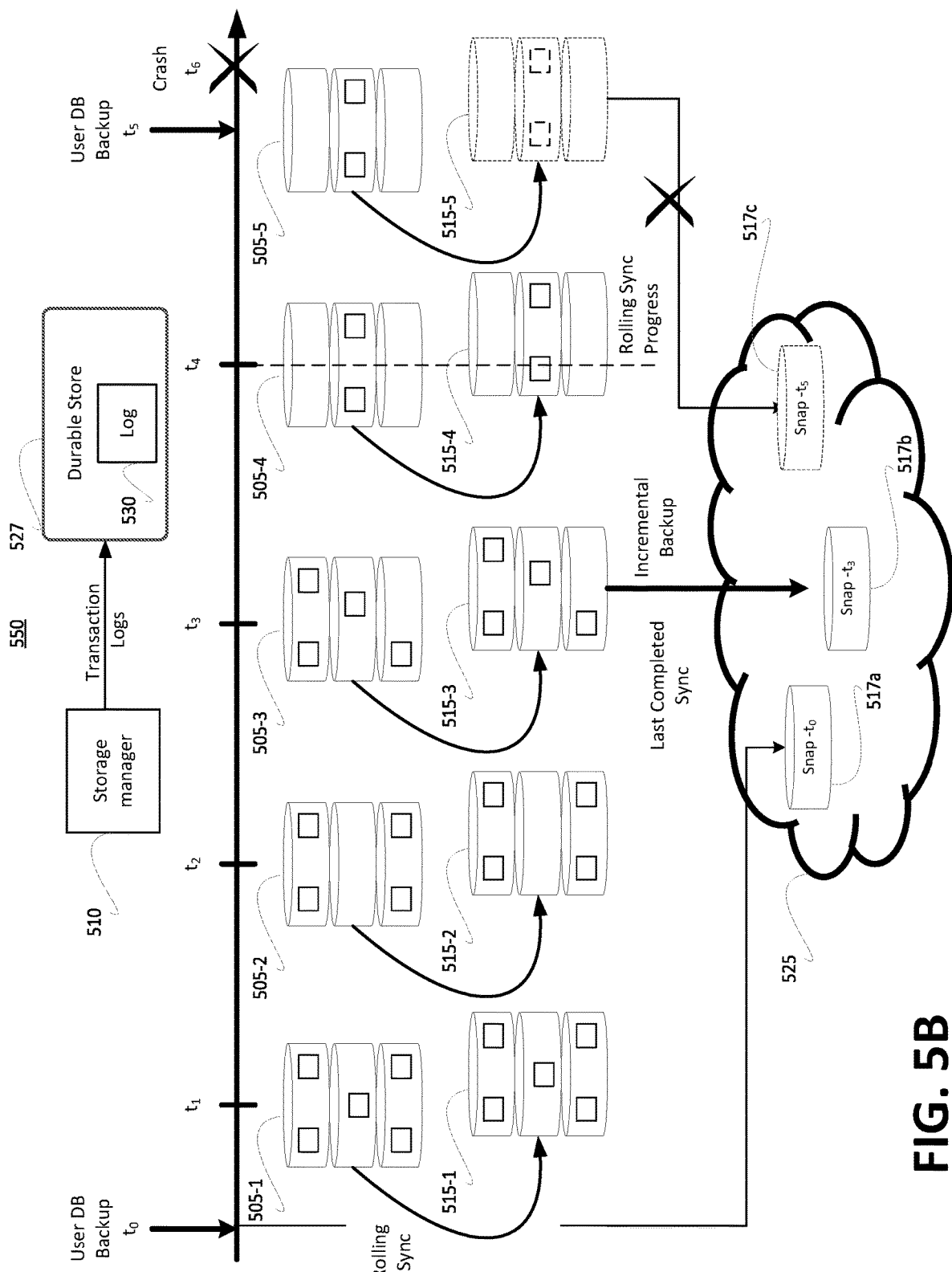
FIG. 5B depicts an example time lapse of a crash that occurs during the time lapse process of FIG. 5A, in accordance with the disclosed techniques.

Turning to FIG. 5B, illustrated is an example time lapse 550 of a snapshot process where a failure occurs at the local storage system. More particularly, the time lapse 550 depicts a time lapse of the scenario where instead of the state 505-5 of the local storage system 505 being synchronized to the cloud storage system 515 to capture the snapshot 517c, the local storage system 505 experiences a crash at time $t_6$ before the cloud storage system 515 reached state 515-5. As illustrated, due the time lag to actually synchronize the pending changes to the cloud-based storage system 515, the storage manager 510 had only completed synchronization of the state 505-4 of the local storage system 505 to the cloud based storage system 515.

Figure 6:
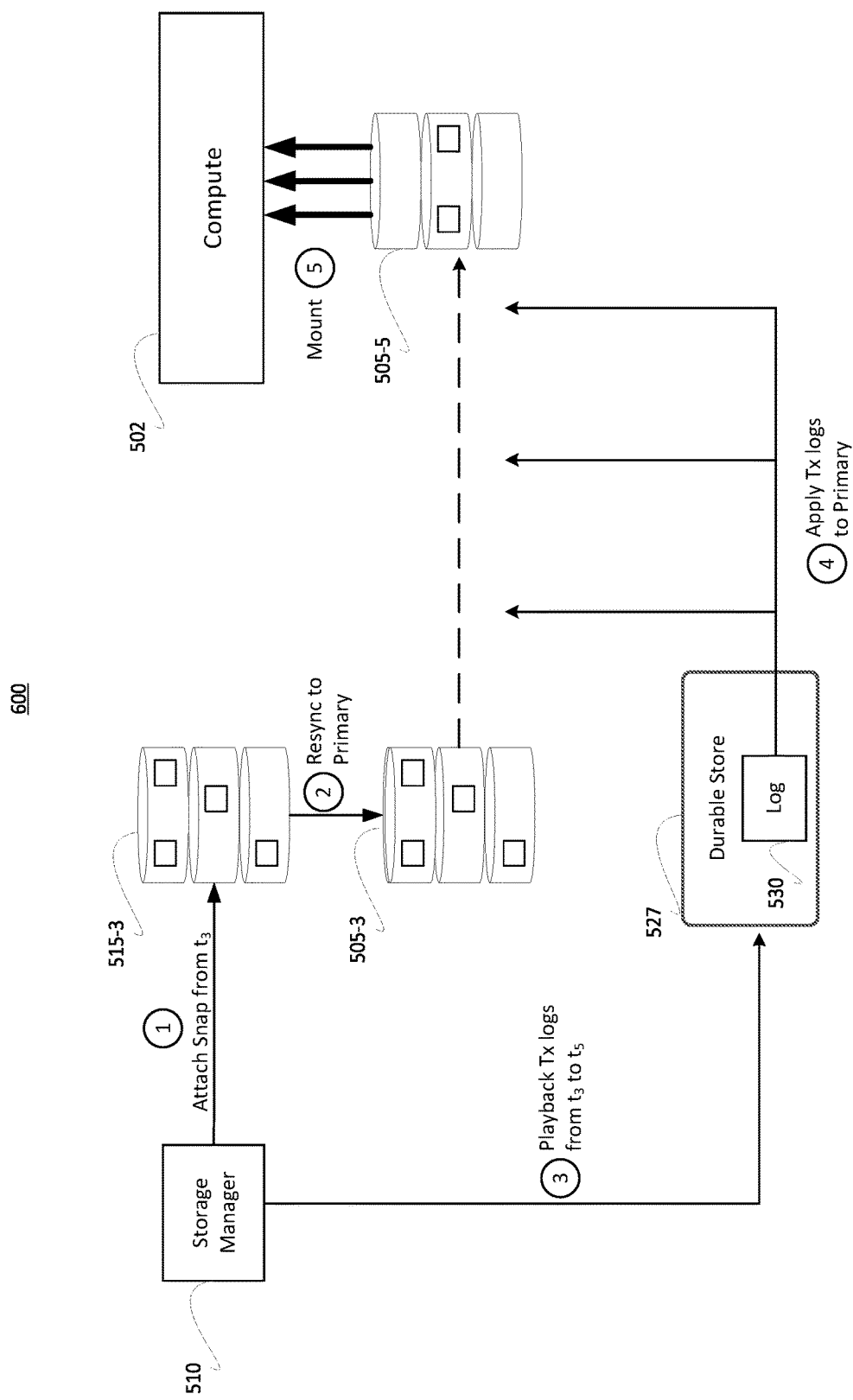
FIG. 6 depicts an example process for restoring a local storage system using the transaction logging techniques, in accordance with the disclosed techniques.

With simultaneous reference to FIG. 6, illustrated is a process 600 by which the storage manager 510 restores the local storage system 505 in response to the failure at time $t_6$ in a manner that avoids data loss. As such, the storage manager 510 is able to (eventually) capture the user-requested snapshot of the state 505-5 of the local storage system 505 despite the occurrence of the failure.

In response to detecting the failure at time $t_6$, the storage manager 510 may be configured to identify the most recent snapshot 517 stored at the cloud snapshot storage 525. In the time lapse 550, this is the snapshot 517b indicative of the state 505-3 of the local storage system 505 at time $t_3$. Accordingly, the process 600 begins when the storage manager 510 attaches (1) the snapshot 517b to the cloud-based storage system 515 using the typical snapshot restore process for the cloud storage provider of the cloud-based storage system 515.

The storage manager 510 then synchronizes (2) the state 515-3 of the cloud-based storage system 515 to the local storage system 505. When the synchronization process completes, the local storage system 505 has returned to the state 505-3 associated with the most recently captured snapshot 517b.

The storage manager 510 is also configured to analyze the transaction log 530 to identify a set of transaction logs that occurred after the most recent snapshot. Accordingly, the storage manager 510 may analyze metadata associated with the snapshot 517b to identify a time at which the state of the local storage system 505 was captured (i.e., $t_3$—which is different from the subsequent time the cloud-based snapshot 517b of the cloud-based storage system was captured). The first transaction included in the transaction log 530 that occurred after $t_3$ may be the first log of the identified set of transactions. The storage manager 510 may also identify a time at which the user-directed snapshot that failed to synchronize was detected (i.e., $t_5$). Accordingly, the last transaction in the set of transactions may be the last transaction performed prior to time $t_5$. While the instant scenario relates to recovering the local-storage system 505 to a state associated with a requested snapshot, in other scenarios that don't require capturing an intermediate state of the local storage system 505, the storage manager 510 may simply include all of the transactions that occurred after $t_3$ in the set of transactions.

After defining the set of transactions and detecting that the state of the local storage system 505 is fully synchronized to the state 505-3, the storage manager 510 may then instruct (3) the local storage system 505 to playback the transactions included in the set of transactions. At this point, the local storage system 505 starts sequentially applying (4) the transactions in the identified set of transactions such that, upon processing all of the transactions in the set of transactions, the local storage system 505 reflects the state 505-5 when the user requested the snapshot at time $t_5$. As such, when the storage manager 510 mounts (5) the local storage system 505 to the compute 502 (such as the computes 102, 302), the local storage system 505 reflects the state 505-5 when the user most recently requested a snapshot, even though the snapshot has not yet been captured by the hybrid storage system. That said, once the local storage system 505 is fully restored to the state 505-5, the storage manager 510 may re-initiate the process to synchronize the data changes since the previous snapshot (i.e., the data changes reflected by the transactions included in the identified set of transactions) back to the cloud-based storage system 515 to finally capture the requested snapshot 517c.

Figure 7:
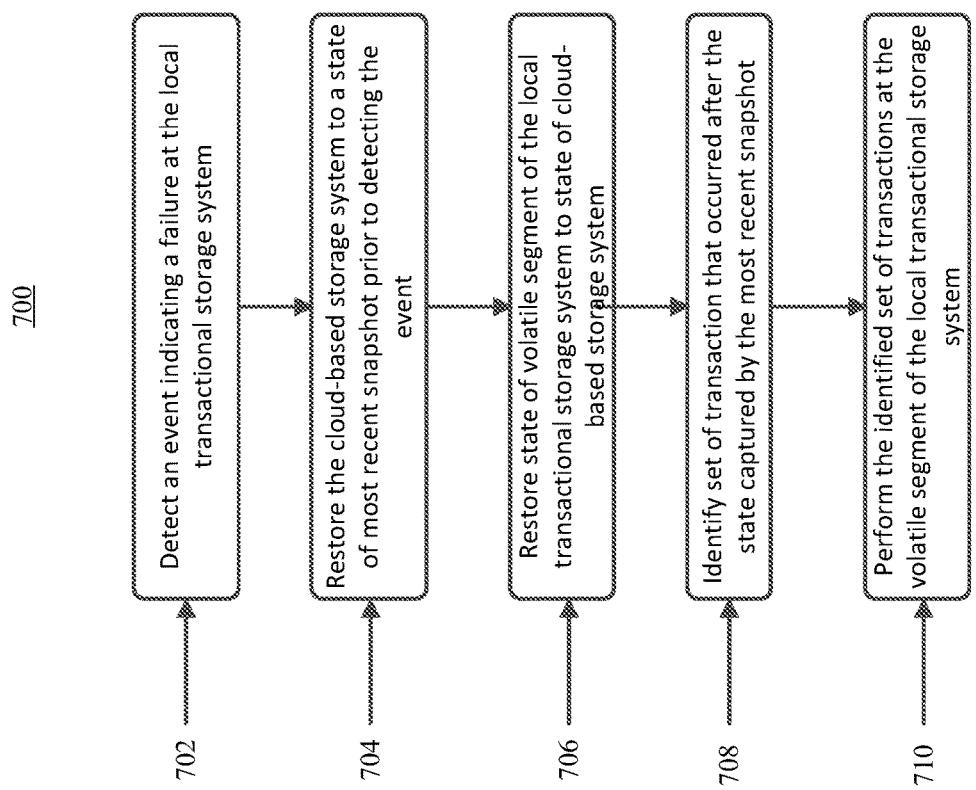
FIG. 7 depicts a flow diagram of an example method for preventing data loss at a local storage system, according to one embodiment.

FIG. 7 depicts a flow diagram of an example method 700 for preventing data loss at a volatile storage system in accordance with the techniques described herein. The method 700 may be performed by a storage manager (such as the storage managers 110, 310, 510). Accordingly, the storage manager may include a first network interface communicatively coupled to an local transactional storage system (such as the local storage systems 105, 205, 305) that includes a volatile segment configured to stare the data maintained at the local transactional storage system and a durable segment configured to store a transaction log of transactions performed by the local transactional storage system. Accordingly, in some embodiments, the local transactional storage system is configured to write an entry to the transaction log upon performing the transaction. The storage manager also includes a second network interface communicatively coupled to a cloud-based storage system (such as the cloud-based storage systems 115, 215, 315, 515). To perform the various actions described with respect to the method 700, the storage manager may be configured to execute a set of computer-readable instructions via one or more processors.

The method 700 begins at block 702 when the storage manager detects an even indicating a failure at the local transactional storage system and/or the volatile segment thereof. As described herein, the failure may cause a power loss event at the volatile segment of the local transactional storage system. As a result, the state of the volatile segment of the local transactional storage system is reset to a default condition.

In some embodiments, storage manager is configured to detect an event indicating that a state of the volatile segment of the local transactional storage system is to be captured as a snapshot via the cloud-based storage system (e.g., by performing the techniques described with respect to the example method 400). For example, in some embodiments, the local transactional storage system is associated with one or more performance thresholds, for example, a data churn threshold. In some embodiments, the storage manager is configured to detect operation of the local transactional storage system exceeding the performance metric; and automatically generate the event indicating that a state of the volatile segment of the local transactional storage system is to be captured as a snapshot via the cloud-based storage system. Accordingly, in some embodiments, the event indicating the failure at the local transactional storage system is detected prior to synchronizing the cloud-based storage system with the state of the volatile segment of the local transactional storage system that is to be captured via the snapshot.

At block 704, in response to detecting the event, the storage manager restores the cloud-based storage system to a state indicated by a most recent snapshot of the cloud-based storage system captured prior to detecting the event. In some embodiments, the cloud-based storage system obtains the most recent snapshot from a cloud snapshot storage coupled thereto (such as the cloud snapshot storage 125, 225, 325, 525). In some embodiments where the event indicating the failure is detected prior to synchronizing the cloud-based storage system with the state of the volatile segment, the most recent snapshot of the cloud-based storage reflects a state of the volatile segment of the local transactional storage system prior to detecting the event indicating that the state of the volatile segment of the local transactional storage system is to be captured as a snapshot.

At block 706, the storage manager restores the state of the volatile segment of the local storage system to the state of the cloud-based storage system. More particularly, in some embodiments the storage manager is configured to detect an event indicating that the cloud-based storage system completed updating to the state indicated by the most recent snapshot of the cloud-based storage system; and, in response to detecting the event indicating that the update is complete, restore the state of the volatile segment to the state of the cloud-based storage system.

At block 708, the storage manager identifies a set of transactions in the transaction log that occurred after a state captured by the most recent snapshot. Additionally, in some embodiments where the event indicating the failure is detected prior to synchronizing the cloud-based storage system with the state of the volatile segment, the set of transactions also occurred prior to the event indicating that the snapshot of the volatile segment of the local transactional storage system is to be captured as a snapshot.

At block 710, subsequent to restoring the volatile segment of the local transactional storage system, the storage manager performs the identified set of transactions at the volatile segment of the local transactional storage system. Additionally, in some embodiments where the event indicating the failure is detected prior to synchronizing the cloud-based storage system with the state of the volatile segment, the storage manager is configured to (1) detect that local transactional storage system performed the identified set of transactions; (2) in response to detection the performance of the identified set of transactions, update a state of the cloud-based storage system to reflect the state of the volatile segment of the local transactional storage system; and (3) generate a cloud snapshot of the cloud-based storage system.

In some embodiments, the storage manager is also configured to obtain a set of pending data changes of the local transactional storage system, wherein the set of pending data changes indicate a change to a state of the volatile segment of the local transactional storage system from a previous state. In response to the set of pending data changes satisfying a threshold metric, the storage manager updates a state of the cloud-based storage system to reflect the change to the state of the volatile segment of the local transactional storage system indicated by the set of pending data changes. In some embodiments, the threshold metric is a heuristic-based metric based on one or more of a number of blocks changed by the set of pending data changes, CPU usage for a compute to which the local transactional storage system is mounted, a processing speed for synchronization worker, a time mapping of data churn for the local transactional storage system, a volume of transactions to be processed by the local transactional storage system, and a proportion of read transactions to write transactions in the transactions to be processed.

In some embodiments, to update the state of the cloud-based storage system, the storage manager is configured to analyze a heuristic-based metric to determine a number of workers to be instantiated to synchronize the set of pending data changes. Additionally, in some embodiments, the storage manager analyzes a heuristic-based metric to determine a number of workers to be instantiated to synchronize the set of pending data changes.

Figure 8:
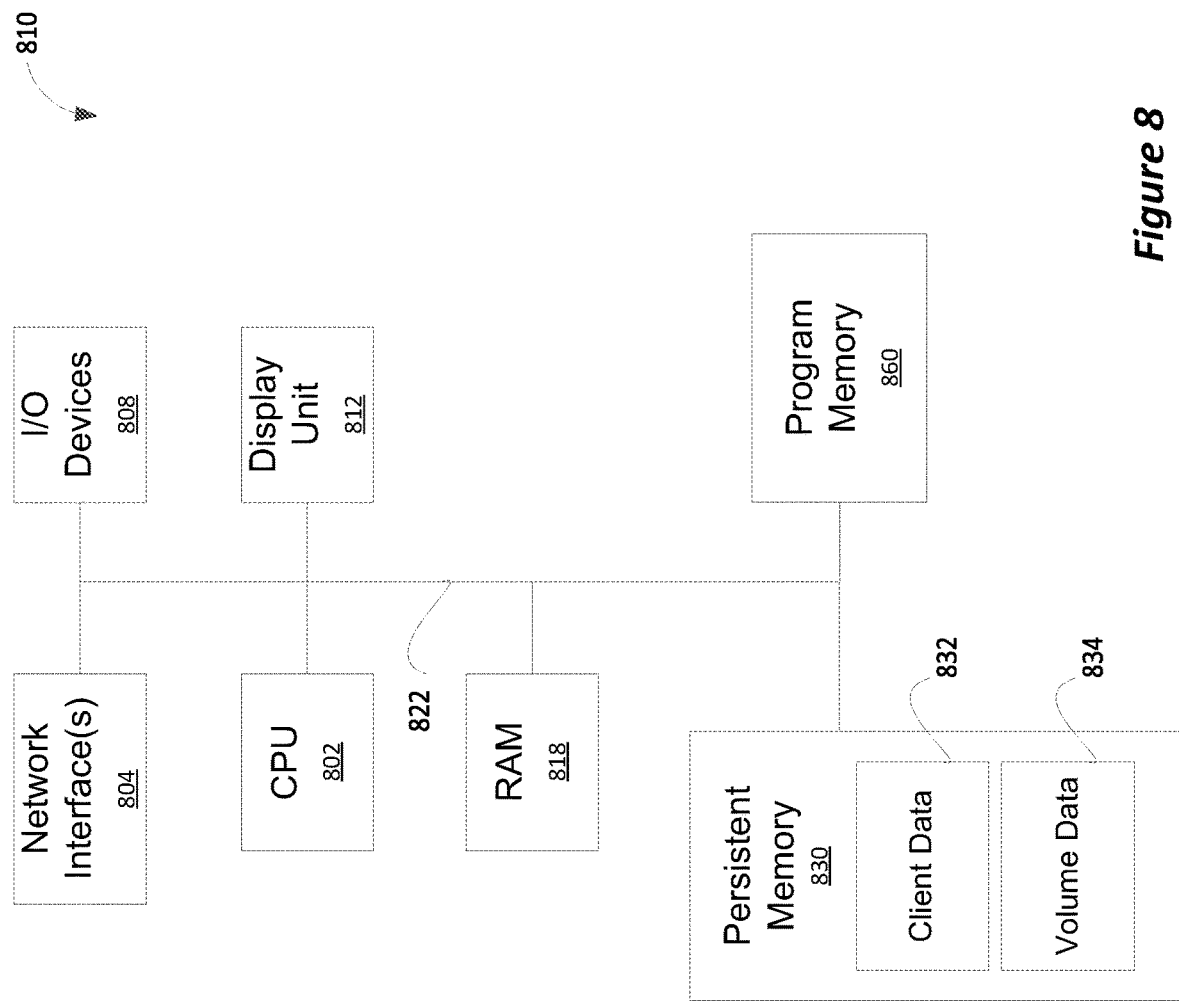
FIG. 8 depicts an example storage manager configured to implement techniques described herein.

Turning now to FIG. 8, FIG. 8 depicts an example storage manager 810 in which the techniques described herein may be implemented, according to an embodiment. For example, the storage manager 810 of FIG. 8 may be the storage managers 110, 210, 310, 510 described herein and configured to perform the process 300 and 600, as well as the methods 400 and 700. The storage manager 810 may include one or more processors, such as the depicted central processing unit (CPU) 802. Although not depicted, the storage manager 810 may also include one or more graphics processing unit (GPU). In some embodiments, the CPU 802 may include one or more parallel processing units capable of processing data in parallel with one another. During operation, the CPU 802 executes instructions stored in a program memory module 860 coupled to the CPU 802 via a system bus 822. The system bus 822 may be any of several types of bus structures including a memory bus or memory controller, a peripheral bus, or a local bus, and may use any suitable bus architecture.

In some implementations, the program memory module 840 is implemented in a random access memory (RAM) module 818, a persistent memory module 830, or both. The program memory module 840 may also store computer-readable instructions that regulate the operation of the storage manager. For example, the program memory 860 may include the management interface 162, the transaction processing module 164, the recovery manager 166, and/or the file system manager 168.

In addition to programs, the RAM module 818 and the persistent memory module 830 may store data in a volatile or non-volatile mode, respectively. The RAM module 818 and the persistent memory module 830 further include one or more forms of fixed and/or removable memory, such as read-only memory (ROM), electronic programmable read-only memory (EPROM), RAM, erasable electronic programmable read-only memory (EEPROM), and/or other hard drives, flash memory, MicroSD cards, and others. As illustrated, the persistent memory 830 may include client data 832 (e.g., indications of performance requirements for the hybrid storage system, configuration information for the hybrid storage system) and volume data (e.g., indications of mappings between the volumes of the local storage system and respective databases).

The storage manager may further include network interfaces 804 that enable the storage manager 810 to send and receive data over a wireless or wired network. Accordingly, the network interfaces 804 may include one or more transceivers (e.g., WWAN, WLAN, WPAN, EVDO, CDMA, GSM and/or LTE transceivers) functioning in accordance with IEEE standards, 3GPP standards, or other standards. In some embodiments, a first network interface in configured to interface with a local storage system and a second network interface is configured to interface with a cloud-based storage system. Additionally, as shown in FIG. 8, the storage manager 810 a display unit 812 and/or I/O components 808 (e.g., ports, capacitive or resistive touch sensitive input panels, keys, buttons, lights, LEDs, speakers, microphones) to facilitate system maintenance and/or updates and other tasks. In some embodiments, both network interfaces may utilize the same physical port (e.g., an Ethernet port), but establish separate interfaces on a session layer supported by the communications routed via the physical port.

While FIG. 8 depicts the components of the storage manager 810 being connected via the system bus 822, in other embodiments, the storage manager is implemented as a virtualized component of a cloud computing environment. In these embodiments, the physical components that operate in conjunction to perform the functionality of the storage manager 810 may be distributed between many different physical systems. Accordingly, the components of the storage manager 810 may include additional buses and/or coordination interfaces that ensure the distributive performance of the described functionality. Similarly, in these embodiments, the network interfaces 804 may be considered logical interfaces at which the virtualized components that form the storage manager 810 may be addressed.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

As it is used herein, the term "event" is not limited to the "event" software structure implemented by many computing systems. To this end, many computing systems include an event bus via which components write events to the bus in order to inform other components of a its state or condition. In response, the other components monitoring the event bus may perform some action based on the information included in the event. While the instant disclosure envisions these types of events, the instant teachings are not limited to computing systems that utilize an event bus or to the particular messages written to an event bus. Instead, the term "event" is to be understood as an indication of a condition of a computing and/or storage system and/or an instruction to perform a particular task using any suitable software structure.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A system comprising:
   a first network interface communicatively coupled to an ephemeral storage system;
   a second network interface communicatively coupled to a cloud-based storage system;
   one or more memories storing computer-readable instructions; and
   one or more processors operatively connected to the first and second network interfaces and the one or more memories, wherein the one or more processors are configured to execute the computer-readable instructions to:
      obtain a set of pending data changes of the ephemeral storage system, wherein the data changes indicate changes to a state of the ephemeral storage system from a previous state;
      in response to the set of pending data changes satisfying a threshold metric, update a state of the cloud-based storage system to reflect the changes to the state of the ephemeral storage system indicated by the set of pending data changes;
      detect an event indicating that a cloud-based snapshot is to be generated; and
      in response to detecting the event:
         compile a first set of pending data changes that indicates changes to the state of the ephemeral storage system from a previous state of the ephemeral storage system to a state at a time indicated by the event;
         update a state of the cloud-based storage system to reflect the change to the state of the ephemeral storage system indicated by the first set of pending data changes;
         generate a snapshot of the cloud-based storage system; and
         store the snapshot of the cloud-based storage system in a cloud snapshot storage.

2. The system of claim 1, wherein to detect the event, the one or more processors are configured to execute the computer-readable instructions to:
   detect an event indicative of a user-directed snapshot request.

3. The system of claim 1, wherein the one or more processors are configured to execute the computer-readable instructions to:
   determine a data churn metric for the cloud-based storage system; and
   in response to the data churn metric satisfying a threshold value, generate an incremental cloud snapshot that reflects the sets of pending data changes that have occurred since generating a prior snapshot of the cloud-based storage system.

4. The system of claim 3, wherein to generate the snapshot of the cloud-based storage system, the one or more processors are configured to execute the computer-readable instructions to:
update a most recent incremental cloud snapshot using the first set of pending data changes.

5. The system of claim 1, wherein the threshold metric is a heuristic-based metric based on one or more of the following factors: a number of blocks changed by the set of pending data changes, processor usage for a compute to which the ephemeral storage system is mounted, a processing speed for a synchronization worker, a time mapping of data churn at the ephemeral storage system, a volume of transactions to be processed by the ephemeral storage system, and a proportion of read transactions to write transactions in the transactions to be processed.

6. The system of claim 1, wherein to update the state of the cloud-based storage system, the one or more processors are configured to execute the computer-readable instructions to:
instantiate two or more workers to synchronize the blocks changed by the set of pending data changes in parallel.

7. The system of claim 6, wherein to generate the two or more threads, the one or more processors are configured to execute the computer-readable instructions to:
analyze a heuristic-based metric to determine a number of workers to be instantiated to synchronize the pending data changes.

8. The system of claim 1, wherein the one or more processors are configured to execute the computer-readable instructions to:
detect an event indicating that the ephemeral storage system is to be restored to a state associated with the snapshot of the cloud-based storage system.

9. The system of claim 8, wherein the one or more processors are configured to execute the computer-readable instructions to:
restore the cloud-based storage system using the snapshot of the cloud-based storage system; and
synchronize the state of the ephemeral storage system to reflect the state of the restored cloud-based storage system.

10. The system of claim 8, wherein the event indicating that the ephemeral storage system is to be restored includes an indication of time at which the first set of pending data changes was compiled.

11. The system of claim 8, wherein:
the event indicating that the ephemeral storage system is to be restored is automatically generated upon startup of the ephemeral storage system; and
the snapshot of the cloud-based storage system is a most recent snapshot of the cloud-based storage system.

12. The system of claim 8, wherein the event indicating that the ephemeral storage system is to be restored is an event indicative of a user-initiated restore request.

13. The system of claim 11, wherein:
the ephemeral storage system is included in a local transactional storage system that includes a durable segment configured to store a transaction log of transactions performed by the ephemeral storage system;
the event indicating that the ephemeral storage system is to be restored is automatically generated upon startup of the ephemeral storage system after detecting a failure at the ephemeral storage system while updating the state of the cloud-based storage in response to detecting the event indicating that the cloud-based snapshot is to be generated; and the one or more processors are configured to execute the computer-readable instructions to:
identify a set of transactions in the transaction log that occurred after the event indicating that the cloud-based snapshot is to be generated; and
subsequent to restoring the ephemeral storage system, perform the identified set of transactions at the ephemeral storage system.

14. The system of claim 1, wherein to obtain the set of pending data changes of the ephemeral storage system, the one or more processors are configured to execute the computer-readable instructions to:
input the data maintained in a block of the ephemeral storage system into a hash function to generate a hash value for the block; and
detect that the hash value for the block has changed from a previous hash value for the block.

15. The system of claim 1, wherein to obtain the set of pending data changes of the ephemeral storage system, the one or more processors are configured to execute the computer-readable instructions to:
obtain a set of transactions performed by the ephemeral storage system since beginning the update of the state of the cloud-based storage system to reflect the previous state of the ephemeral storage system.

16. A method comprising:
obtaining a set of pending data changes of an ephemeral storage system, wherein the data changes indicate changes to a state of the ephemeral storage system from a previous state;
in response to the set of pending data changes satisfying a threshold metric, updating a state of the cloud-based storage system to reflect the changes to the state of the ephemeral storage system indicated by the set of pending data changes;
detecting an event indicating that a cloud-based snapshot is to be generated; and
in response to detecting the event:
compiling a first set of pending data changes that indicates changes to the state of the ephemeral storage system from a previous state of the ephemeral storage system to a state at a time indicated by the event;
updating a state of the cloud-based storage system to reflect the change to the state of the ephemeral storage system indicated by the first set of pending data changes;
generating a snapshot of the cloud-based storage system; and
storing the snapshot of the cloud-based storage system in a cloud snapshot storage.

17. The method of claim 16, further comprising:
determining a data churn metric for the cloud-based storage system; and
in response to the data churn metric satisfying a threshold value, generating an incremental cloud snapshot that reflects the sets of pending data changes that have occurred since generating a prior snapshot of the cloud-based storage system.

18. The method of claim 16, wherein the threshold metric is a heuristic-based metric based on one or more of the following factors: a number of blocks changed by the set of pending data changes, processor usage for a compute to which the ephemeral storage system is mounted, a processing speed for a synchronization worker, a time mapping of data churn at the ephemeral storage system, a volume of transactions to be processed by the ephemeral storage system, and a proportion of read transactions to write transactions in the transactions to be processed.

19. The method of claim 16, further comprising:
    detecting an event indicating that the ephemeral storage system is to be restored to a state associated with the snapshot of the cloud-based storage system.

20. The method of claim 19, wherein:
    the event indicating that the ephemeral storage system is to be restored is automatically generated upon startup of the ephemeral storage system; and
    the snapshot of the cloud-based storage system is a most recent snapshot of the cloud-based storage system.

* * * * *